UNITED STATES PATENT OFFICE.

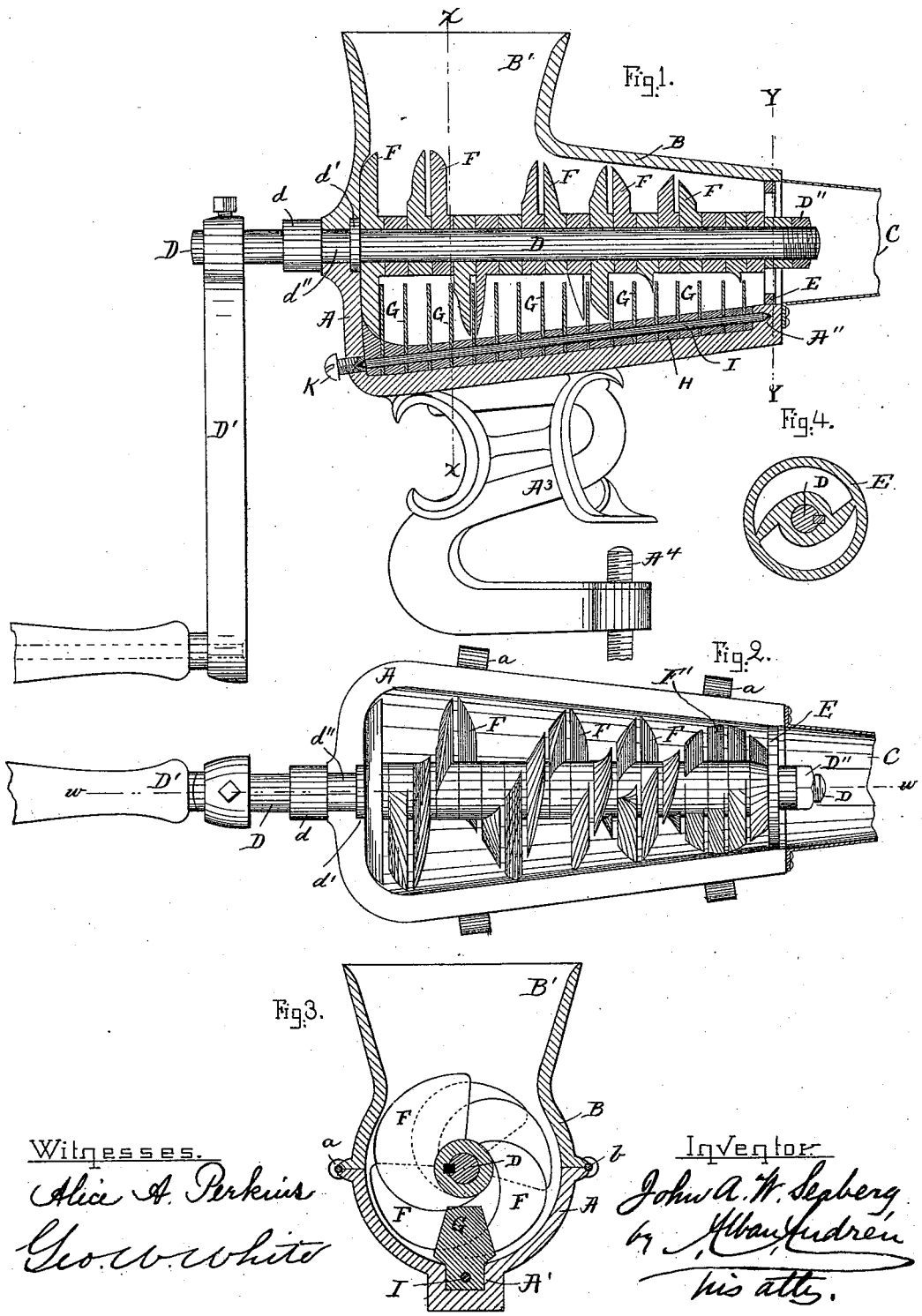

JOHN A. W. SEABERG, OF BOSTON, MASSACHUSETTS.

MEAT-CUTTING MACHINE.

SPECIFICATION forming part of Letters Patent No. 469,097, dated February 16, 1892.

Application filed May 7, 1891. Serial No. 391,877. (No model.)

*To all whom it may concern:*

Be it known that I, JOHN A. W. SEABERG, a citizen of Sweden, and a resident of Boston, in the county of Suffolk and State of Massachusetts, have invented new and useful Improvements in Meat-Cutting Machines, of which the following, taken in connection with the accompanying drawings, is a specification.

This invention relates to improvements in meat-cutting machines, and it is carried out as follows, reference being had to the accompanying drawings, wherein—

Figure 1 represents a central longitudinal section of the machine taken on the line W W, Fig. 2. Fig. 2 represents a top plan view showing the upper half of the shell as removed. Fig. 3 represents a cross-section on the line X X, shown in Fig. 1; and Fig. 4 represents a cross-section on the line Y Y, also shown in Fig. 1.

Similar letters refer to similar parts wherever they occur on the different parts of the drawings.

The shell or casing is made in two parts A and B, as usual, forming together a conical chamber containing the cutting devices. The parts A and B are pivoted together at $a$ $a$ and locked together at the opposite side, preferably by means of a suitable locking-pin $b$ or other convenient locking device, as is common in machines of this kind.

B' is the hopper in the larger end of the shell portion B, as shown in Figs. 1 and 3.

C is a delivery-tube through which the cut-up meat is ejected, said tube being preferably secured in a suitable manner to the lower shell portion A, as shown in Figs. 1 and 2.

D is the cutter-shaft, having secured to its outer end the crank D', by means of which the cutter-shaft is turned by hand during the meat-cutting operation. The cutter-shaft is provided with collars $d$ $d'$ nearest the crank end, and between said collars is a cylindrical portion $d''$, which is journaled in the shells A B, as shown in Figs. 1 and 2, and by this arrangement the shaft is free to rotate, but prevented from longitudinal motion in the direction of its axis. To the opposite end of the shaft D is rigidly secured a perforated disk E, the periphery of which bears against the internal surface of the shells A and B, so that the latter sustains the disk while it rotates with the shaft. This disk not only constitutes a support for the delivery end of the shaft, but permits the cut meat to escape freely without crowding at the exit-opening.

On the shaft D is splined a series of spiral cutters F F, which are secured together upon said shaft between the collar $d'$ and the perforated disk E by means of a nut D'', screwed onto the free end of the shaft D, as shown in Figs. 1 and 2. The cutters F extend in a spiral line round the shaft D and decrease uniformly in diameter from the receiving to the delivery end of the casing, composed of the shells A and B. At the delivery end of the casing the shaft D is provided with an increased number of spiral cutters F' for the purpose of effectually cutting the meat without unduly crowding it through the perforated disk E. By means of the increased number of spiral blades F' I effectually cut up the meat without squeezing out the juices, whereby the cut meat is left in a condition similar to its condition when cut manually with a knife. An objection to ordinary meat-cutters resides in the fact that the meat is not cut up evenly, but is unduly forced out at the delivery end of the casing, so that the juices are squeezed out and it is left dry and fibrous. This is entirely avoided by the increased number of spiral cutters F' at the delivery end of the shaft.

In the bottom of the shell portion A is made a longitudinal groove or recess A', adapted to receive the lower ends of the stationary knives G G and the divider-blocks H H, by means of which said knives are held at proper distances apart corresponding to the distances between the rotary knives F F.

I is a fastening-rod passing through perforations in the stationary knives and divider-blocks, one end of said rod extending into a recess A'' in the front end of the shell A, while its other end extends into a recess in the inner end of a set-screw K, which fits a screw-threaded socket in the shell A and serves to clamp the blocks H and knives G firmly in position. The rod I serves to prevent the blocks H and the knives G from working or rising upward out of their proper position in the groove A'. A³ is a bracket, as usual, on the shell A, by means of which and a suitable screw A⁴ the device may be clamped to a shelf or table when it is desired to use it.

What I wish to secure by Letters Patent, and claim, is—

A meat-cutter consisting of a casing having its bottom portion formed with a longitudinal groove A', the knives G and divider-blocks H, arranged in the said groove, the rod I, extending through all the divider-blocks and knives and engaged at one extremity with the delivery end of the casing, the set-screw K, fitting a screw-threaded socket in the receiving end of the casing and provided at its inner end with a recess which receives one extremity of the said rod, and the cutter-shaft D, having spiral cutters F, substantially as described.

In testimony whereof I have signed my name to this specification, in the presence of two subscribing witnesses, on this 4th day of May, A. D. 1891.

JOHN A. W. SEABERG.

Witnesses:
ALBAN ANDRÉN,
ALICE A. PERKINS.